United States Patent
Brunzema et al.

(10) Patent No.: US 11,531,596 B2
(45) Date of Patent: Dec. 20, 2022

(54) HYPERSCALER INDEPENDENT VERSIONING OF CLOUD STORAGE OBJECTS

(71) Applicant: SAP SE, Walldorf (DE)

(72) Inventors: Martin Brunzema, Berlin (DE); Henrik Hempelmann, Havelberg (DE); Benedikt Klus, Hamburg (DE); Anne Roessiger, Berlin (DE); Stefan Voss, Postsdam (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 16/870,421

(22) Filed: May 8, 2020

(65) Prior Publication Data

US 2021/0349788 A1 Nov. 11, 2021

(51) Int. Cl.
*G06F 11/00* (2006.01)
*G06F 11/14* (2006.01)
*G06F 16/18* (2019.01)

(52) U.S. Cl.
CPC ...... *G06F 11/1464* (2013.01); *G06F 11/1451* (2013.01); *G06F 16/1873* (2019.01)

(58) Field of Classification Search
CPC ............ G06F 11/1464; G06F 11/1451; G06F 16/1873
See application file for complete search history.

(56) References Cited

U.S. PATENT DOCUMENTS

| 10,838,912 | B1 * | 11/2020 | Chopra ................. G06F 16/122 |
| 2007/0256055 | A1 * | 11/2007 | Herscu ................. G06F 9/44505 717/115 |
| 2020/0127937 | A1 * | 4/2020 | Busick .................... H04L 45/34 |
| 2021/0004389 | A1 * | 1/2021 | Shivashankara ........ G06F 40/20 |

* cited by examiner

*Primary Examiner* — Craig S Goldschmidt
(74) *Attorney, Agent, or Firm* — Buckley, Maschoff & Talwalkar LLC

(57) ABSTRACT

A system and method to receive, by a backup service layer of a database service instance, a request to create a data backup; create, in response to the request and internally of the backup service, a backup having a filename including a version identifier; and transmit the created backup to a hyperscaler to be stored in a cloud object storage of the hyperscaler, the filename of the backup being a key for the storage of the backup in the cloud object storage.

18 Claims, 9 Drawing Sheets

700

RECEIVE, BY A BACKUP SERVICE LAYER OF A DATABASE
SERVICE, A REQUEST TO CREATE A DATA BACKUP

705

CREATE, IN RESPONSE TO THE REQUEST AND
INTERNALLY OF THE BACKUP SERVICE, A BACKUP
HAVING A FILENAME INCLUDING A VERSION IDENTIFIER

710

TRANSMIT THE CREATED BACKUP TO A HYPERSCALER TO
BE STORED IN A CLOUD OBJECT STORAGE OF THE HYPERSCALER,
THE FILENAME OF THE BACKUP BEING A KEY FOR THE STORAGE
OF THE BACKUP IN THE CLOUD OBJECT STORAGE

| Database Service ID | Backup name | Final file name | Version ID | Versioned Object key |
|---|---|---|---|---|
| f62373_471108 | Full data backup | Full data backup_databackup_2_1 | 1585070045 | f62373_471108/Full data backup_databackup_2_1585070045 |
| f62373_471108 | Monday | Monday_databackup_2_1 | 1585070152 | f62373_471108/ Monday_databackup_2_1585070152 |
| 78d2f3_101bca | Monday | Monday_databackup_2_1 | 1585070334 | 78d2f3_101bca/ Monday_databackup_2_1585070334 |
| 78d2f3_101bca | Monday | Monday_databackup_2_1 | 1585070369 | 78d2f3_101bca/ Monday_databackup_2_1585070369 |

805 — Database Service ID
810 — Backup name
815 — Final file name
820 — Version ID
825 — Versioned Object key
800

*FIG. 8*

HYPERSCALER INDEPENDENT VERSIONING OF CLOUD STORAGE OBJECTS

BACKGROUND

A number of large cloud infrastructure and service providers have emerged to provide the infrastructure to support customers in need of robust and reliable storage and compute needs. A benefit offered by these providers is that they are highly scalable, responsive to their customers' needs. These large cloud infrastructure and service providers may provide an incredibly large amount of storage that can be used to accommodate the customers individually and aggregately, scaling up and out as need be to accommodate increasing storage and processing requirements. In some regards, backup of an organization's data system(s) is vitally important, in case of system outages and other customer critical situations involving potential data loss and/or data inconsistencies. Large cloud infrastructure and service providers might provide a remote storage location for customer data backups, while also offering improved resilience and availability of the backups.

Some large cloud infrastructure and service providers may host services and storage for hundreds of thousands or even millions of customers. In some implementations, one of the services provided may be a versioning service or mechanism that generates a version for the backups created for a customer. While the versioning provided by a cloud infrastructure and service provider might be useful in differentiating different backups of a same file, the multiple different cloud infrastructure and service providers might also each provide their own implementation of versioning, if any. As such, compatibility problems may arise if a customer having backup versioning provided by a first cloud infrastructure and service provider wants to share or otherwise provide their versioned backups to a second cloud infrastructure and service that implements its own variety of backup versioning, if any at all.

Accordingly, there exists a need for versioning of backups that is independent of the versioning provided, if any, by a cloud infrastructure and service provider.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an illustrative flow diagram of a process for versioning of cloud storage objects, in accordance with an example embodiment.

FIG. 8 is an illustrative representation of a database related to a backup storage consumption system and process herein, in accordance with an example embodiment.

Figure 1:
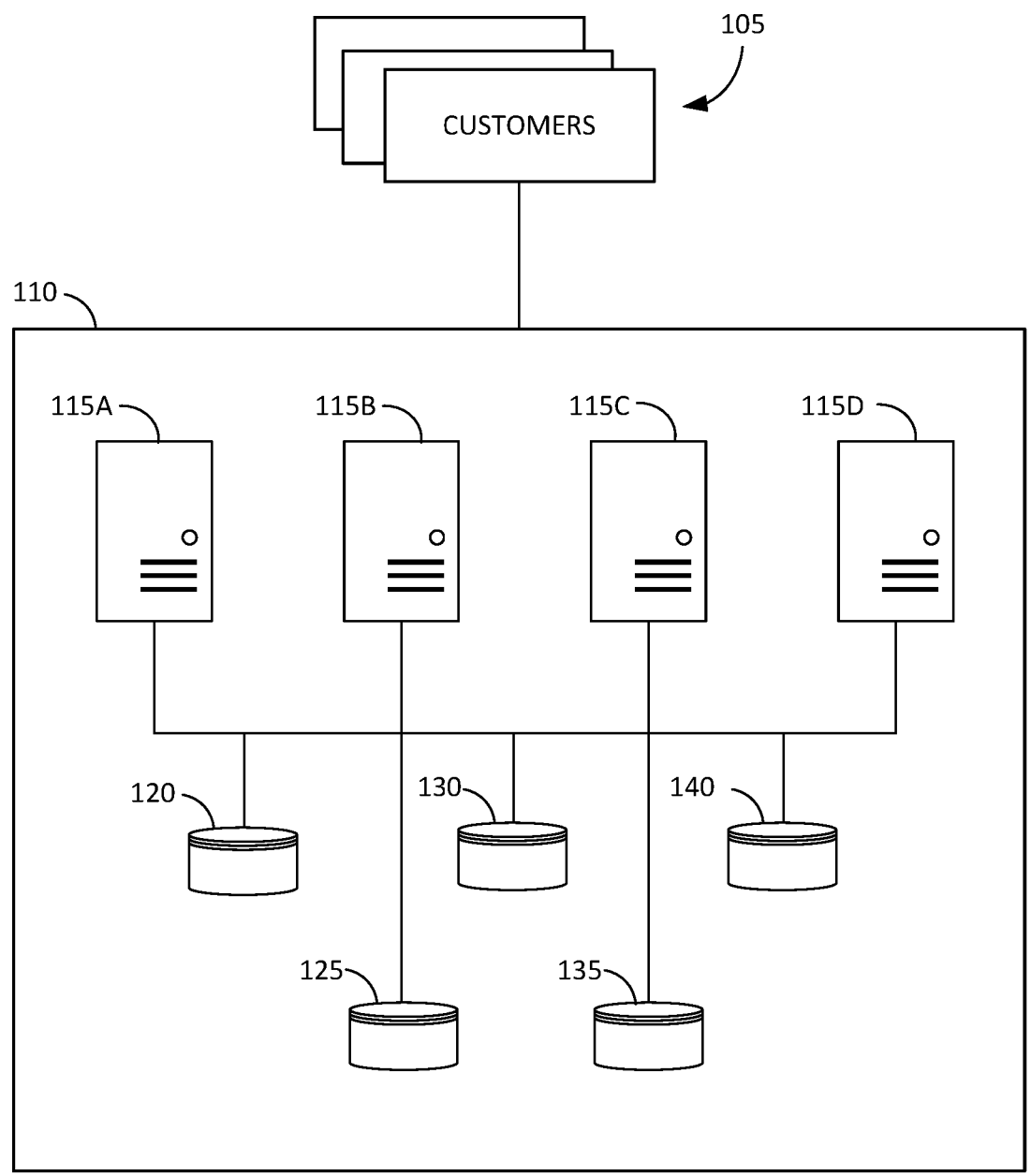
FIG. 1 is an illustrative block diagram of a hyperscaler environment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As used herein, the term "hyperscaler" refers to a company or other entity that provides, for example, public cloud and cloud service industries, although other services and businesses might also be provided. Hyperscalers provide cloud storage and compute infrastructures on a scale (i.e., size and extent) that far exceeds that of typical data centers. Hyperscalers may provide, maintain, and upgrade the infrastructure, including hardware, (customized) software, facilities, power management systems, etc. to provide services to customers with improved uptime. While Hyperscalers might provide a number of different services to end users (e.g. customers), aspects related to the data storage provided by a hyperscalers are, in some embodiments, significant to the present disclosure.

FIG. 1 is a high level illustrative depiction of a hyperscaler architecture 100, in accordance with an embodiment herein. A hyperscaler 110 includes all of the hardware, software, networks, facilities, energy management systems, and other operational aspects, whether custom or commodity acquisitions, to enable and support large cloud infrastructure and services for large numbers of users 105 (e.g., millions of customers of hosted services). All of these different aspects of the hyperscaler are not shown in FIG. 1. FIG. 1 includes illustrative representations of the many (e.g., >100,000) servers and storage devices implemented by the example hyperscaler to support the massive storage and compute capabilities of the its cloud infrastructure. Shown are servers 115A, 115B, 115C, and 115D that are networked to each other and to data storage devices/systems 120, 125, 130, 135, and 140. The servers and data storage devices depicted in FIG. 1 may include redundancies of some or all of each other to provide, in conjunction with certain executable processes, the reliability and resiliency of the hyperscaler environment 100. Additionally, FIG. 1 is an illustrative, figurative representation of hyperscaler servers and data storage devices/systems, as opposed to an actual physical or logical configuration thereof. In some aspects, the features of the present disclosure are not limited to any particular configuration or implementation of a hyperscaler.

Hyperscaler 100 may host a database for one or more of customers 105 in the cloud provided by its cloud infrastructure, where the database is provided as a service to the clients (i.e., Database-as-a-Service, DBaaS). In some aspects, the database offered by hyperscaler 100 stores backups for database service instances in an object storage where the backups (i.e., data) are stored as distinct "objects". Referring to the example of FIG. 1, the object storage may be provided and maintained by the storage devices/systems 120, 125, 130, 135, and 140, in part and/or different combinations.

Figure 2:
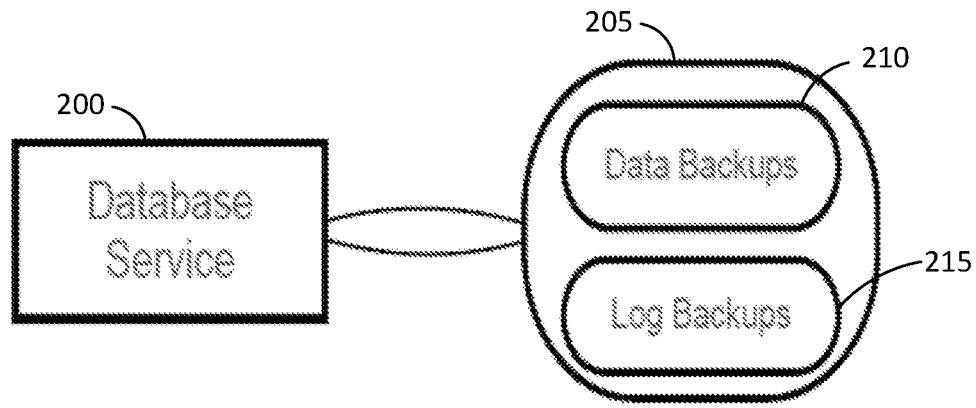
FIG. 2 is a diagram illustrating an overview of a database storing cloud storage objects in a hyperscaler environment.

FIG. 2 is a diagram illustrating an overview of a database service storing data backups in object storage of a hyperscaler. In the example of FIG. 2, data backups of database service instance 200 may be stored as objects in the object storage 205 of a particular hyperscaler. As illustrated, the backup may comprise data backups 210 and log backups 215. In some aspects, the name used for a backup may be the filename the database service created in naming the file being backed up. Furthermore, the filename of the backup may be used as the key for the storage of the backup in the object store 205. In this manner, each backup can have a unique name within the object store.

If multiple backups are written of the same name in the example of FIG. 2, then the previous backups will be overwritten. To overcome this shortcoming, the hyperscaler providing object store 205 may provide some type of versioning mechanism. When activated, the versioning mechanism may operate to automatically provide versioning of multiple backups of the same name to the same destination. In some aspects, the hyperscaler may use the filename as the object key for storage of the backup and an additional version indicator that is generated by the hyperscaler versioning mechanism. In order to access a particular backup for which there are numerous versions (e.g., for a recovery process, to delete the particular backup, etc.), the original filename in the key and the additional version indicator information will be specified in a request or command.

Figure 3:
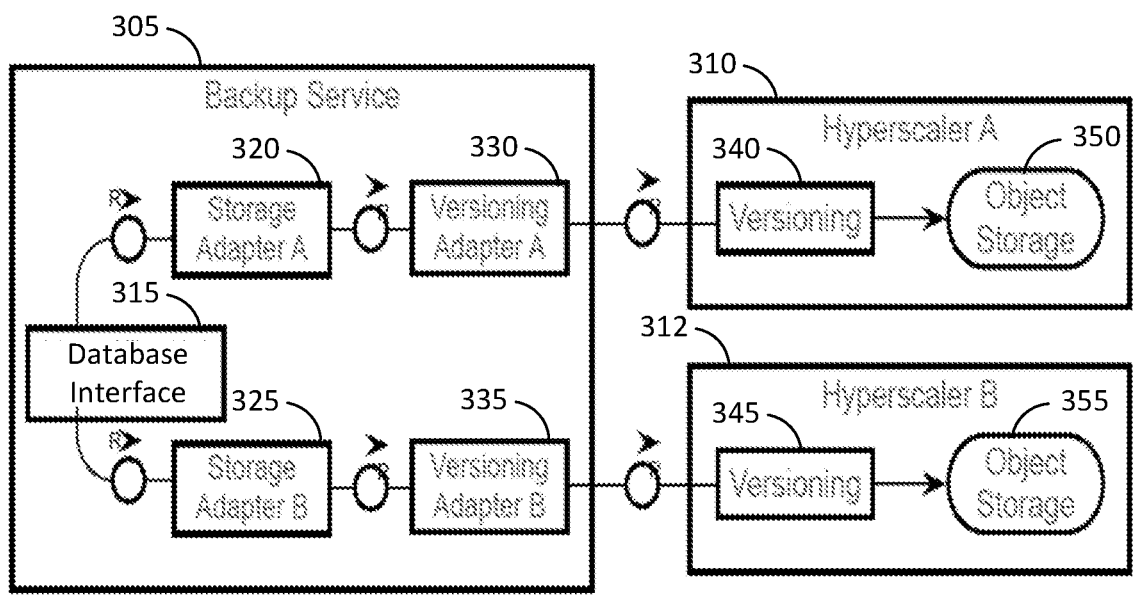
FIG. 3 is an illustrative block diagram of an architecture for versioning cloud storage objects based on internal versioning provided by a hyperscaler.

FIG. 3 is an illustrative block diagram of an architecture 300 for versioning cloud storage objects based on versioning provided by a hyperscaler. FIG. 3 includes a database service 305, including a backup service layer thereof, that creates backups that are stored in object storage of hyperscalers 310, 312 that provides internal versioning of the backups. As used in this context, "internal" refers to the inside of the hyperscaler 310, 312 where the hyperscaler creates versions of the same key object within its storage infrastructure. Referring to FIG. 3, a backup service 305 connected to a database backup writer (not shown) via an interface 315 (e.g., API) is connected with a storage adapter 320, 325 where the storage adapter is a generic interface that implements the operations of backup, restore, and delete and allows the backup service to connect to different service technologies (e.g., Hyperscaler A 310 and Hyperscaler B 312). In the example of FIG. 3, Hyperscaler A and Hyperscaler B are different hyperscalers. As such, backup service 305 includes a storage adapter 320 for connecting to Hyperscaler A 310 and a storage adapter 325 for connecting to Hyperscaler B 312. Backup service 305 also includes versioning adapters 330, 335 that are configured to handle the different versioning implementations provided by different hyperscalers (e.g., Hyperscaler A 310 and Hyperscaler B 312). Inside of each hyperscaler 310, 312 there is a versioning component 340, 345 that performs versioning on the backups received by hyperscaler A 310 and hyperscaler B 312, respectively. The versioned backups created by the versioning components 340 and 345 are stored in the corresponding object stores 350, 355 of Hyperscaler A and Hyperscaler B, respectively.

In some aspects, a backup writer of the database may be able to process and handle information about the backup key, as well as an additional identifier in the backup catalog of the database. As such, the backup writer may be able to use the versioning support provided by the different hyperscalers in FIG. 3 in the form of the additional identifier and use that additional identifier in both backup and recovery operations.

Figure 4:
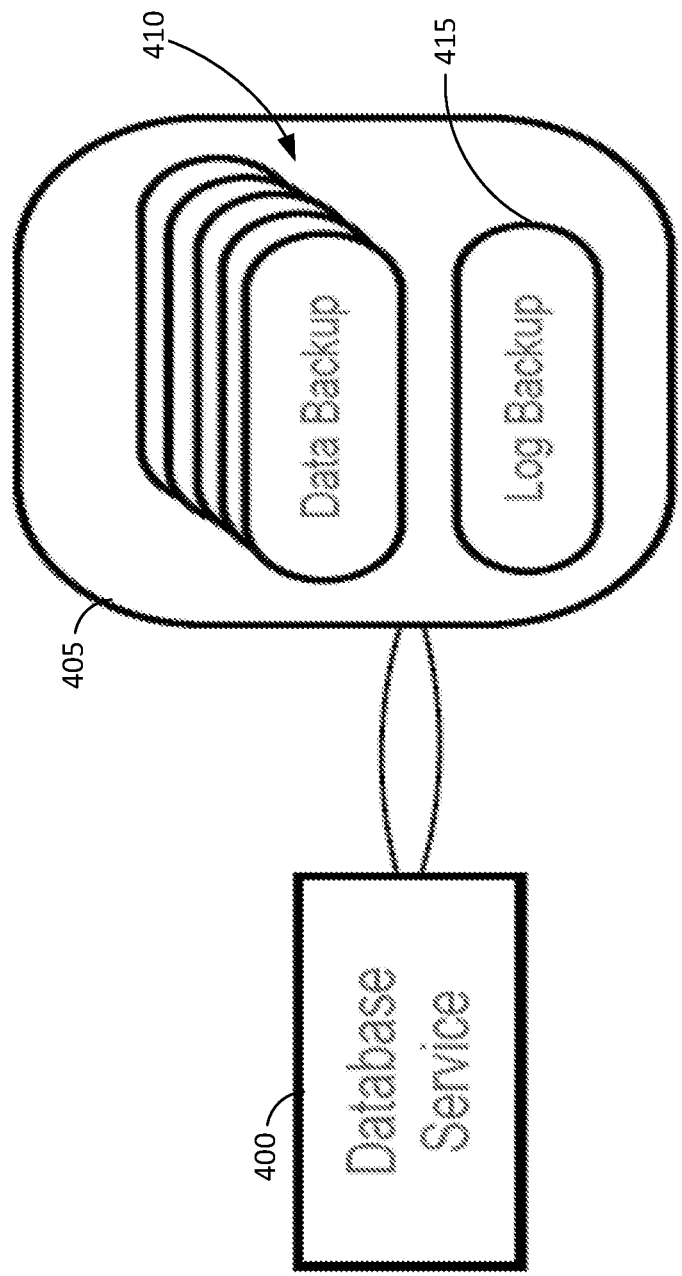
FIG. 4 is a diagram illustrating versioning of cloud storage objects based on internal versioning provided by a hyperscaler environment.

FIG. 4 is a diagram illustrating some aspects of versioning of objects stored in cloud object stores based on internal versioning provided by a hyperscaler environment. In the example of FIG. 4, database service 400 writes backups that are stored in an object store 405 of a hyperscaler. The hyperscaler provides its own implementation of versioning for objects stored in its object store. For multiple backups of a same object, the hyperscaler creates multiple versions of the object having the same name (i.e., key=Filename_1) and an additional version indicator (e.g., a version string such as, for example, Ver_1, Ver_2, . . . ) generated by the hyperscaler's versioning mechanism. In FIG. 4, an illustrative depiction of the multiple versions generated for multiple backups of a same object are shown at 410. FIG. 4 also shows the log backup associated with the data backup versions at 410.

In some aspects, the internal versioning provided by a hyperscaler (e.g., FIGS. 3 and 4) might introduce and/or present challenges to a database service involving one or more of these hyperscalers. For example, different hyperscalers might each offer versioning support that is different from the versioning of other hyperscalers. Even slight differences in versioning implementations may have to be accounted for by backup services of a database relying on the one or more different hyperscalers for backup storage. Accordingly, internal versioning by hyperscalers might cause, for example, more confusion, complex implementations, and other problems related to the versioning support for database services.

In some embodiments, the present disclosure introduces a hyperscaler independent versioning system and process for cloud storage objects that, in part, extends an object key for a cloud storage object with some version identifier. In some aspects, the versioning support offered by a hyperscaler (if any) can be turned off, bypassed, or otherwise not used by a backup service of a database service instance. Some embodiments may guarantee that each backup has a unique name, where the unique name is used as the object key for storing the backup in an object store of a hyperscaler. The hyperscaler independent versioning of cloud storage objects disclosed herein is provided by (i.e., inside) the backup service of a database service instance. That is, the hyperscaler independent versioning of cloud storage objects disclosed herein is external to the object storage of a hyperscaler. In some aspects, the same implementation of hyperscaler independent versioning of cloud storage objects disclosed herein may be used with different hyperscalers, thereby circumventing the problems and limitations presented by the internal versioning support offered by hyperscalers that can vary between the different hyperscaler providers. Moreover, by being independent of the versioning offered by individual hyperscaler implementations, the hyperscaler versioning of cloud storage objects disclosed herein may be decoupled from the implementation, design, and update schedule of the hyperscaler's versioning support.

Figure 5:
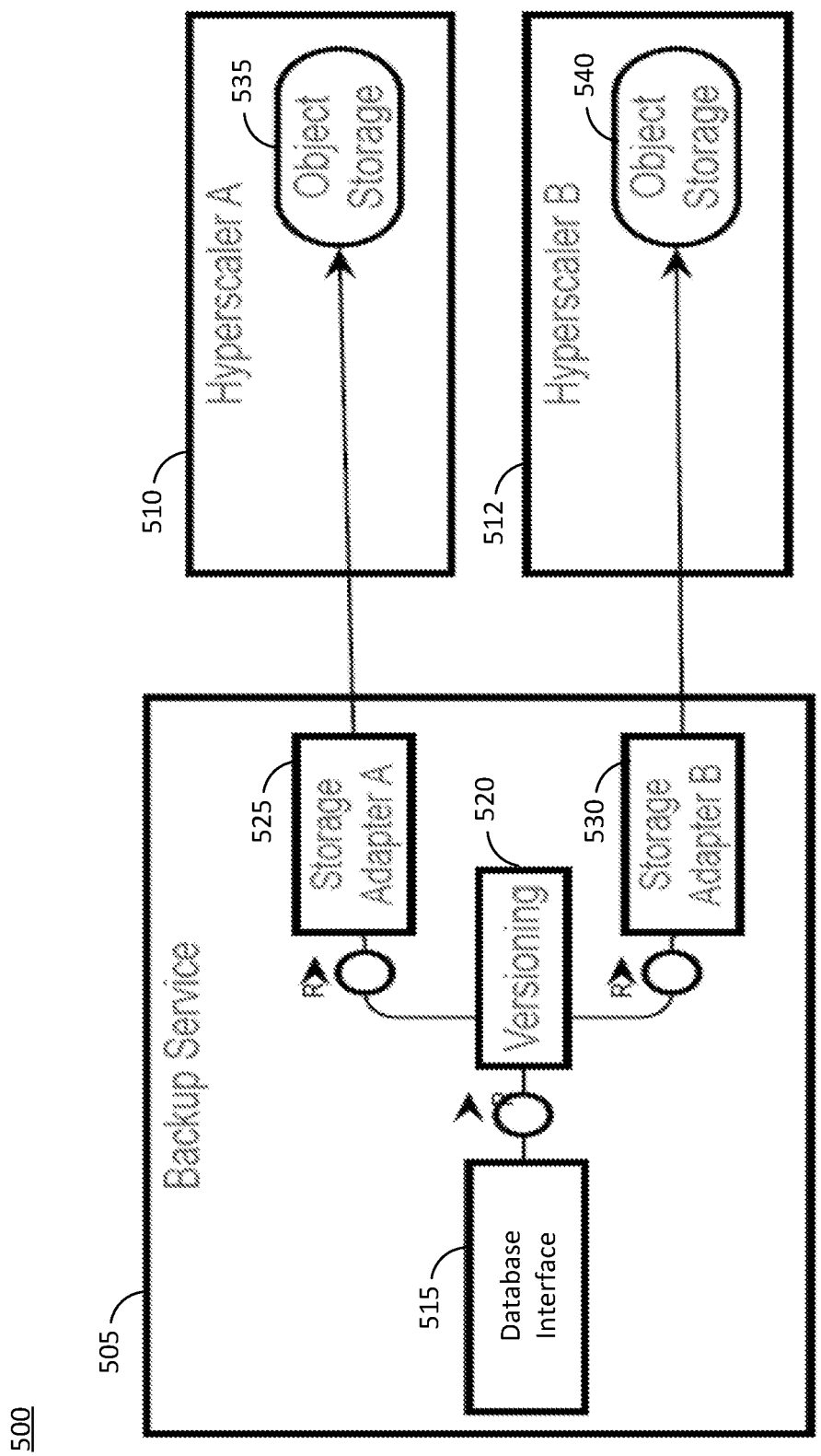
FIG. 5 is an illustrative block diagram of an architecture for versioning cloud storage objects independent of versioning provided by a hyperscaler, in accordance with an example embodiment.

FIG. 5 is an illustrative block diagram of an architecture 500 for versioning cloud storage objects independent of versioning provided by a hyperscaler, in accordance with an example embodiment. Architecture or framework 500 includes a backup service 505 of a database service instance and, by way of example, two hyperscalers 510 and 512 that each offer their own object store 535 and 540, respectively.

Referring to FIG. 5, backup service 505 is connected to a database backup writer (not shown) via an interface 515 (e.g., API). Inside of the backup service in a layer between the backup writer and a hyperscaler specific storage interface (e.g., Storage Adapter A 525 and Storage Adapter B 530) is a versioning component 520 that performs all of the backup related tasks such as, for example, creating a version, creating a version identifier, adding a version identifier to the backup key, modifying storage parts, etc. The versioning executed by versioning component 520 provides the same versioning implementation to all (i.e., each) of the hyperscalers 510, 512 that the backup service 505 uses to store backups. Backups written by the backup writer of the database are received by backup service 505 via the database interface API 515 and versioning component 520 executes versioning for the backups and sends the backups to the desired hyperscaler 510, 512. The storage adapters 525 and 530 may be generic interfaces that implement the operations of backup, restore, and delete and allow the backup service to connect to different hyperscaler service technologies of Hyperscaler A 510 and Hyperscaler B 512. As shown in FIG. 5, the versioning occurs entirely within the backup service 505 of the depicted database service instance and the same versioning mechanism is used for all objects (e.g., backups) stored in cloud object stores 535 and 540.

In some embodiments, versioning component 520 is in a common (i.e., same) versioning layer inside of the database service and used for all hyperscalers. In some regards, the hyperscaler just stores the backup versions sent thereto and retrieves (in a recovery operation, for example) a backup version requested, as specified by an object key. This configuration is in contrast to prior configurations like FIG. 3 where the versioning component (e.g., FIG. 3, 340 and 345) is provided by each of the hyperscalers, the versioning implementations might vary from each other, and each hyperscaler performs the versioning determinations for backup and recovery process.

In some embodiments, the object key for an object (e.g., backup) to be stored in a hyperscaler object store is the filename of the object. The versioning component (FIG. 5, 520) of the hyperscaler independent versioning system and process herein may operate to expand the object key, the filename of the backup, to implement versioning. The object key (i.e., filename) of a backup might be extended by appending some identifier such as, for example, a timestamp, some other unique identifier, etc. to each backup's original filename. For example, a backup having the original filename "File1name_1" might have its filename (i.e., the object key) expanded to "File1name_1 1995-01-01 13:30:01 UTC", where "1995-01-01 13:30:01 UTC" is a timestamp starting at some date (e.g., Jan. 1, 1970, etc.) using second accuracy so that versions can be distinguished and sorted based on the timestamp information. In some embodiments, the backup writer of the database is able to process and handle information about the backup key. During backup operations, the backup object key (i.e., the filename expanded to include a timestamp or other unique identifier) may be written to a backup catalog and further used in a recovery or other processes. As such, a backup writer of a database may not need to be changed or modified to accommodate and support the versioning mechanism disclosed in a hyperscaler independent versioning system and process disclosed herein.

Figure 6:
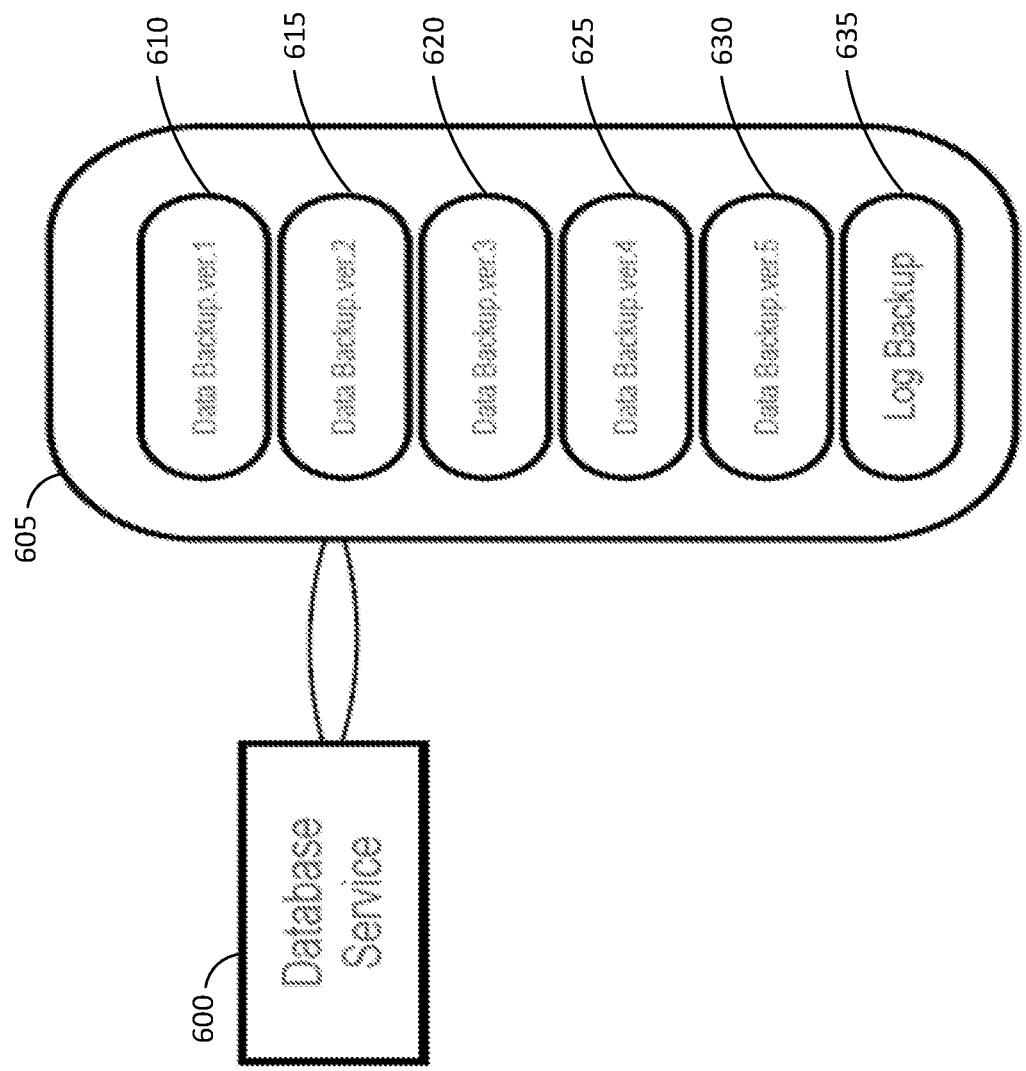
FIG. 6 is a diagram illustrating versioning of cloud storage objects independent of versioning provided by a hyperscaler environment, in accordance with an example embodiment.

FIG. 6 is a diagram illustrating versioning of cloud storage objects independent of versioning provided by a hyperscaler environment, in accordance with an example embodiment. In the example of FIG. 6, database service 600 writes backups that are stored in an object store 605 of a hyperscaler. Since the versioning functionality of the system of FIG. 5 is provided by the versioning layer inside of the database service and used for all hyperscalers, the hyperscaler just stores the backup versions sent thereto and retrieves (in a recovery operation, for example) a requested backup version. Versioning provided by the hyperscaler itself, if any, may be disabled or otherwise not used by the database service. For multiple backups of a same file (to be stored as an "object"), the database service creates a single instance of each file. Multiple versions of a file are not created in the hyperscaler independent versioning provided by the database service, in some embodiments herein. Objects stored in object store 605 of an example hyperscaler include objects 610-630, where each object has a unique object key (i.e., filename). Accordingly, no two objects in the object store 605 have the same key. The backup service of the hyperscaler independent versioning provided by a database service instance herein uses the object key created during a backup operation and expanded to include a timestamp or other unique identifier to store and retrieve different versions of storage objects. Each backup has different object key and accordingly, a different storage location in the object store 605 as shown in FIG. 6. FIG. 6 also shows the log backup associated with the data backup versions at 635.

Note that the hyperscaler independent versioning provided by some embodiments herein is separate and distinct from any versioning support provided by a hyperscaler (e.g., FIGS. 3 and 4). In some instances, an embodiment of the hyperscaler independent versioning herein might include an operation to disable or deactivate the internal versioning provided by a hyperscaler, if possible. In other instances, the internal versioning provided by a hyperscaler might be ignored by the database service implementing its own versioning inside of the database service in a backup service layer as disclosed herein. In some aspects, the hyperscaler independent versioning disclosed herein provides versioning, internally, within the storage layer of the database service that does not depend on any versioning support of the hyperscaler. In some regards, the internal versioning provided by a hyperscaler independent versioning system and process herein is more elegant and robust, as compared to hyperscaler provided versioning support mechanisms.

FIG. 7 is an illustrative flow diagram of a process 700 for versioning of cloud storage objects, in accordance with an example embodiment. At operation 705, a request to create a backup for a file is received by a backup service of a database service instance. In some embodiments, the backup service (e.g., a third-party backup service) may communicate with the database service via an API provided by the database service.

At operation 710, a backup of the file is created in response to the request. Part of creating the backup includes expanding the filename of the file, which acts as the object key for storing the file in an object store of a hyperscaler. The expanding of the key (i.e., filename) may include appending (or some other operation) a timestamp or other unique identifier to the filename of the file so that the resulting filename is itself unique.

Operation 715 includes transmitting the created backup to a hyperscaler where the object will be stored in a cloud object storage of the hyperscaler, wherein the key object for the backup is the filename expanded during operation 710 to create the unique key of the backup.

In some embodiments, a database service implementing a hyperscaler independent versioning system and process herein might be able to transfer a storage object from a first hyperscaler provided by a first hyperscaler provider (e.g., FIG. 5, Hyperscaler A at 510) to a second hyperscaler provided by a second, different hyperscaler provider (e.g., FIG. 5, Hyperscaler B at 512) and have the database restore the stored object in the second, different hyperscaler environment. This type of operation may be possible since versioning support (if any) of the hyperscaler is no longer required or used in versioning of a backup in some embodiments of the hyperscaler independent versioning system and process disclosed herein. In accordance with some embodiments, the version information is created inside of the database backup service and provides the flexibility to migrate or duplicate the data with the storage and move it between different hyperscalers.

Note that a hyperscaler independent versioning system and process disclosed herein may be used, in some embodiments, with databases in which the object key for objects stored in an object store of a hyperscaler is the filename of the file being stored. Moreover, the object key expanded as disclosed herein during the creation of the object to be stored (e.g., a backup of a file) may also be used in a recovery operation. During the recovery, a backup writer might may issue a request including requested files, keys, and versions and the versioning component of the hyperscaler independent versioning system and process disclosed herein may extract the versioning information from the request and send the appropriate, corresponding object key (i.e., filename) to the hyperscaler so that the hyperscaler can retrieve the object having the specified uniquely named object.

FIG. 8 is an illustrative representation of a database related to a hyperscaler independent versioning system and process herein, in accordance with an example embodiment. A table 800 is shown that represents a backup service versioning of cloud storage objects that may be stored in a cloud object storage, according to some embodiments. The table may include, for example, entries detailing objects backed up by a backup service of a database service instance and the versioning thereof by the backup service. For example, table 800 defines a field 805 for a database service ID that identifies each database service within a hyperscaler environment, a name for a backup at 810, a final filename 815 for the backup, a unique version ID 820 created by the backup service implementing the hyperscaler independent versioning, and the versioned object key at 825. As illustrated in table 800, the versioned object key includes a prefix corresponding to the database service ID 805, the final file name 815, and the version ID 820. Accordingly, table 800 demonstrates an example of the backup service expanding the filename of the backup being created to generate the unique versioned object key for each backup.

Figure 9:
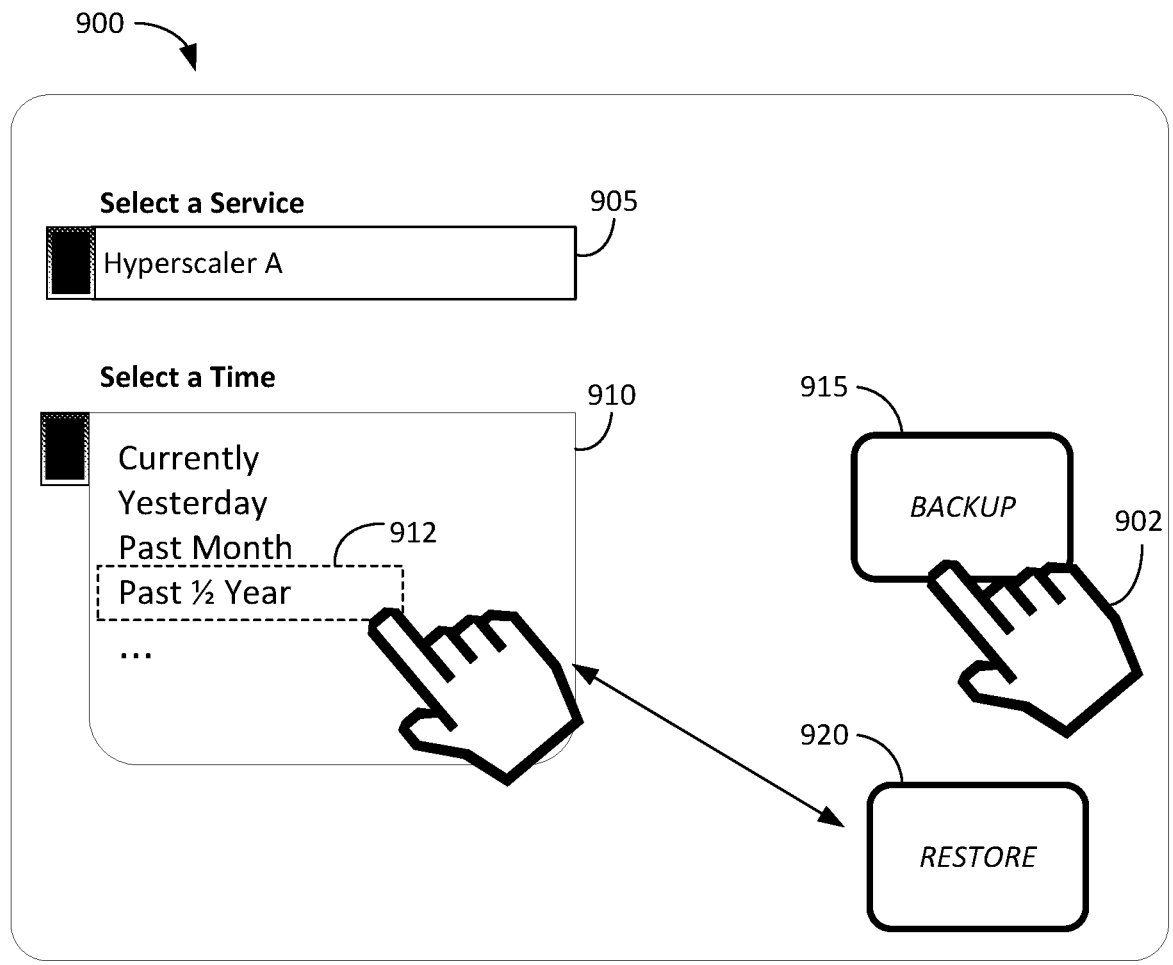
FIG. 9 is an illustrative diagram of an outward facing user interface related to a system and process for versioning cloud storage objects independent of a hyperscaler, in accordance with an example embodiment.

FIG. 9 is an illustrative diagram of an outward facing user interface (UI) 900 related to a hyperscaler independent versioning system and process, in accordance with an example embodiment. UI 900 may be displayed within a display device associated with a database backup service or a display device independent of the database backup service (e.g., a display of a device or system in communication with the database backup service over a network via a browser application). Selection of one or more UI elements (e.g., icons, buttons, drop-down menu options, etc.) by a touch-screen input, computer pointer 902, etc. may result in the initiation or continuance of the hyperscaler independent versioning of cloud storage objects implemented by a database backup service instance (e.g., the selection of "Backup" button 915) or the initiation or continuance of a recovery operation of the database backup service instance (e.g., the selection of "Recovery" button 920). In the example of FIG. 9, UI 900 includes a UI element 905 for selecting a particular hyperscaler storing the cloud storage objects. Additionally, UI 900 includes a drop-down menu 910 that may facilitate selection and entry of a particular time period for a desired backup recovery.

Figure 10:
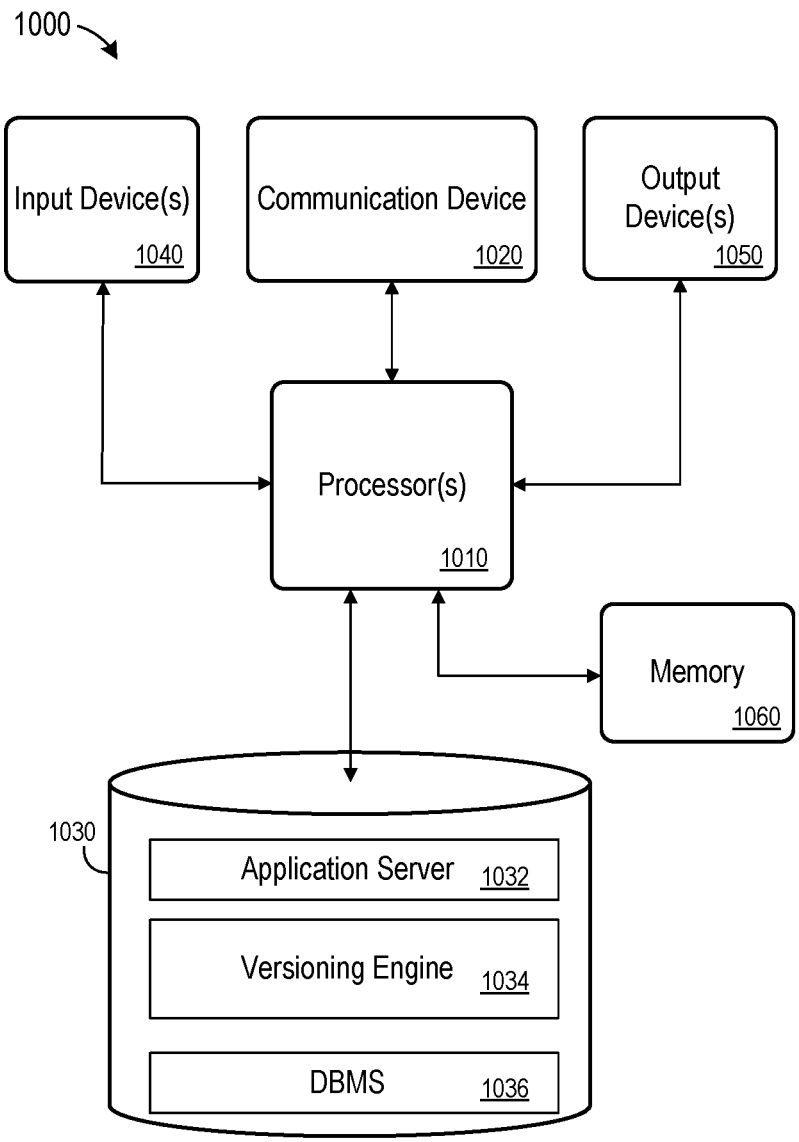
FIG. 10 is an illustrative block diagram of a computing system, in accordance with an example embodiment.

FIG. 10 illustrates a computing system 1000 that may be used in any of the architectures or frameworks (e.g., FIGS. 5, 6) and processes (e.g., FIG. 7) described herein, in accordance with an example embodiment. FIG. 10 is a block diagram of server node 1000 embodying a backup service, according to some embodiments. Server node 1000 may comprise a general-purpose computing apparatus and may execute program code to perform any of the functions described herein. Server node 1000 may comprise an implementation of at least some features of architecture 500 of FIG. 5 in some embodiments. Server node 1000 may include other unshown elements according to some embodiments.

Server node 1000 includes processing unit(s) 1010 operatively coupled to communication device 1020, data storage device 1030, one or more input devices 1040, one or more output devices 1050, and memory 1060. Communication device 1020 may facilitate communication with external devices, such as an external network or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM).

Application server 1032 may each comprise program code executed by processor(s) 1010 to cause server 1000 to perform any one or more of the processes described herein. Versioning engine 1034 may execute one or more processes to implement versioning by a backup service of a database service instance. Embodiments are not limited to execution of these processes by a single computing device. Data storage device 1030 may also store data and other program code for providing additional functionality and/or which are necessary for operation of server 1000, such as device drivers, operating system files, etc. DBMS 1036 may store and manage a variety of data types and structures, including, for example, backup keys.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processor to execute the processor-executable code in order to cause the system to:
   receive, by a backup service layer of a database service instance, a request to create a data backup;
   create, in response to the request and by the backup service, a versioned backup having a filename including a version identifier;
   transmit the versioned backup created by the backup service to multiple different hyperscalers, each having a respective cloud object storage, each of the multiple different hyperscalers:
   storing the transmitted versioned backup in its respective cloud object storage;
   using the filename of the versioned backup as an object key for the storage of the versioned backup created by the backup service in its respective cloud object storage; and
   being configured to provide a respective versioning for the versioned backup, each respective versioning of each of the multiple different hyperscalers being independent of the respective versionings of the remainder of the multiple different hyperscalers.

2. The system of claim 1, wherein only a single instance of the backup is created by the backup service.

3. The system of claim 1, wherein the creating of the backup by the backup service includes appending the version identifier to the filename of the backup.

4. The system of claim 1, wherein the filename is unique to the backup created by the backup service.

5. The system of claim 1, wherein the creating of the versioned backup by the backup service is independent of the respective versionings performed by each of the multiple different hyperscalers.

6. The system of claim 1, wherein the version identifier includes at least one of a timestamp, a unique identifier, and a combination thereof.

7. A computer-implemented method, the method comprising:
   receiving, by a backup service layer of a database service instance, a request to create a data backup;
   creating, in response to the request and by the backup service, a versioned backup having a filename including a version identifier; and
   transmitting the versioned backup created by the backup service to multiple different hyperscalers, each having a respective cloud object storage, each of the multiple different hyperscalers:
   storing the transmitted versioned backup in its respective cloud object storage;
   using the filename of the versioned backup as an object key for the storage of the versioned backup created by the backup service in its respective cloud object storage; and
   being configured to provide a respective versioning for the versioned backup, each respective versioning of each of the multiple different hyperscalers being independent of the respective versionings of the remainder of the multiple different hyperscalers.

8. The method of claim 6, wherein only a single instance of the backup is created by the backup service.

9. The method of claim 6, wherein the creating of the backup by the backup service includes appending the version identifier to the filename of the backup.

10. The method of claim 6, wherein the filename is unique to the backup created by the backup service.

11. The method of claim 6, wherein the creating of the versioned backup by the backup service is independent of the respective versionings performed by each of the multiple different hyperscalers.

12. The method of claim 6, wherein the version identifier includes at least one of a timestamp, a unique identifier, and a combination thereof.

13. A non-transitory, computer readable medium storing instructions, which when executed by at least one processor cause a computer to perform a method comprising:
- receiving, by a backup service layer of a database service instance, a request to create a data backup;
- creating, in response to the request and created by the backup service, a versioned backup having a filename including a version identifier; and
- transmitting the versioned backup created by the backup service to multiple different hyperscalers, each having a respective cloud object storage, each of the multiple different hyperscalers:
  - storing the transmitted versioned backup in its respective cloud object storage;
  - using the filename of the versioned backup as an object key for the storage of the versioned backup created by the backup service in its respective cloud object storage; and
  - being configured to provide a respective versioning for the versioned backup, each respective versioning of each of the multiple different hyperscalers being independent of the respective versionings of the remainder of the multiple different hyperscalers.

14. The medium of claim 13, wherein only a single instance of the backup is created by the backup service.

15. The medium of claim 13, wherein the creating of the backup by the backup service includes appending the version identifier to the filename of the backup.

16. The medium of claim 13, wherein the filename is unique to the backup created by the backup service.

17. The medium of claim 13, wherein the creating of the versioned backup by the backup service is independent of the respective versionings performed by each of the multiple different hyperscalers.

18. The medium of claim 13, wherein the version identifier includes at least one of a timestamp, a unique identifier, and a combination thereof.

* * * * *